United States Patent [19]

Dahl et al.

[11] Patent Number: 4,978,134
[45] Date of Patent: Dec. 18, 1990

[54] FOLDABLE TOWING HITCH FOR VEHICLES

[76] Inventors: Dean R. Dahl, 422 S. Fifth St., Breckenridge, Minn. 56520; Paul G. Syring, 717 Fourth St. South, Wahpeton, N. Dak. 58075

[21] Appl. No.: 399,066

[22] Filed: Aug. 24, 1989

[51] Int. Cl.⁵ .............................................. B60D 1/00
[52] U.S. Cl. .................................. 280/491.4; 280/498; 280/500
[58] Field of Search ............. 280/491.1, 491.2, 491.3, 280/491.4, 491.5, 493, 494, 498, 500, 415.1

[56] References Cited

U.S. PATENT DOCUMENTS

| | | | |
|---|---|---|---|
| 1,591,557 | 7/1926 | Perry | 280/415.1 |
| 2,283,436 | 5/1942 | Hawkins | 280/415.1 |
| 2,378,504 | 6/1945 | Roos | 280/491.3 |
| 2,880,016 | 3/1959 | Peterson | 280/491.3 |
| 2,995,386 | 8/1961 | Peterson | 280/491.4 |
| 3,105,706 | 10/1963 | Adam | 280/491.4 |
| 3,281,163 | 10/1966 | Wiebe | 280/491.4 |
| 3,572,765 | 3/1971 | Tieben | 280/491.4 |
| 3,627,352 | 12/1971 | Canole | 280/475 |
| 3,704,900 | 12/1972 | Gerber | 280/491.4 |
| 3,774,949 | 11/1973 | Eger | 293/117 |
| 3,794,355 | 2/1974 | Cracolice | 280/491.4 |
| 4,013,303 | 3/1977 | Milner | 280/491.4 |
| 4,856,805 | 8/1989 | Davis | 280/491.4 |
| 4,869,521 | 9/1989 | Johnson | 280/491.1 |

FOREIGN PATENT DOCUMENTS

| | | | |
|---|---|---|---|
| 1171112 | 7/1984 | Canada | 280/491.4 |
| 2623447 | 5/1989 | France | 280/491.2 |
| 1428650 | 10/1988 | U.S.S.R. | 280/491.1 |

Primary Examiner—Charles A. Marmor
Assistant Examiner—Victor E. Johnson
Attorney, Agent, or Firm—Paul L. Sjoquist

[57] ABSTRACT

A foldable towing hitch attachable to a vehicle, having a pair of articulately attached arms extendable therefrom, one of said arms being foldable for collapsing both arms against the vehicle for storage, and further having a hitch bracket retaining the extended arms in a converged relationship and attachable to a second towed vehicle.

8 Claims, 3 Drawing Sheets

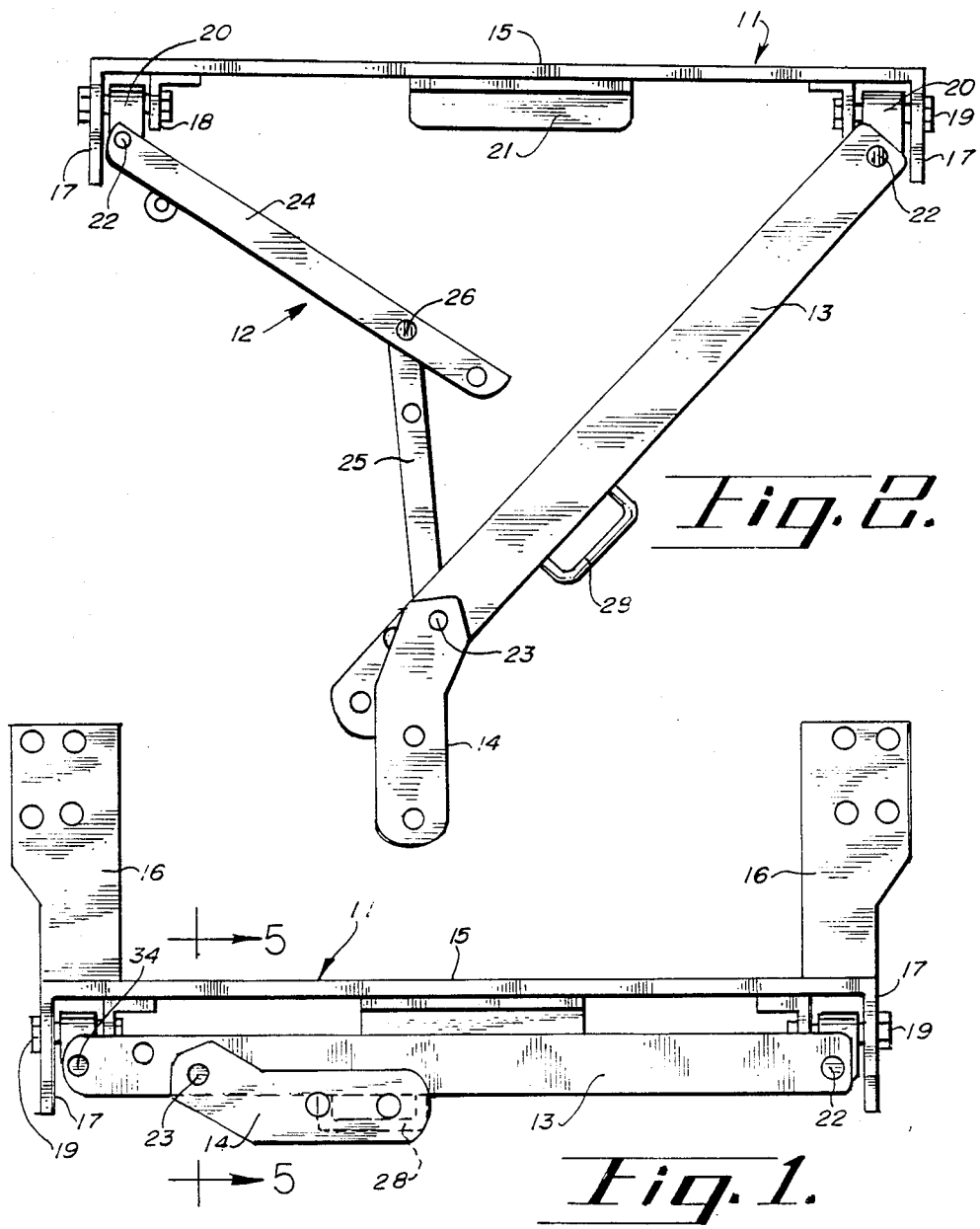

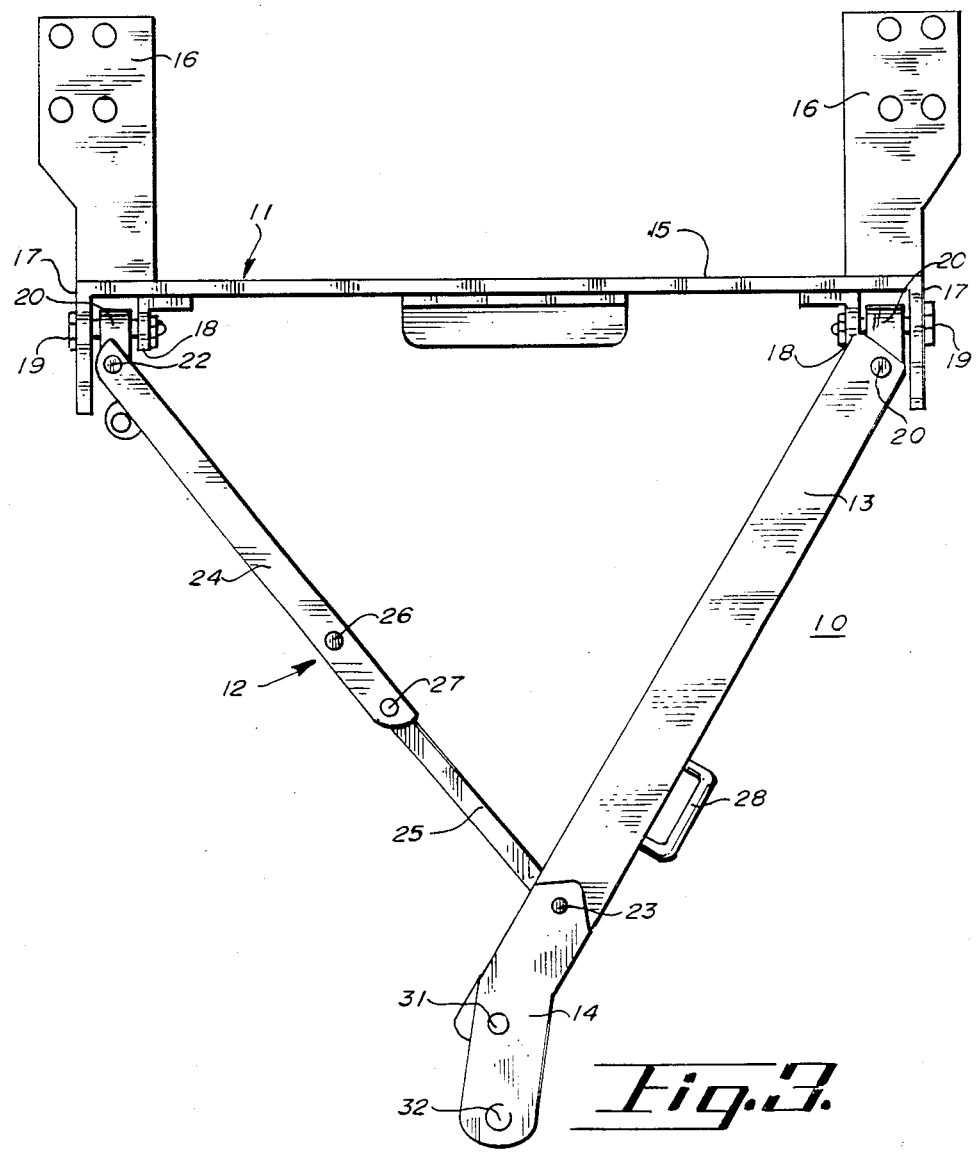

FOLDABLE TOWING HITCH FOR VEHICLES

BACKGROUND OF THE INVENTION

The present invention relates generally to devices for towing a vehicle and the like, more particularly to a foldable self-storing tow bar attachable to the towed vehicle.

The prior art reveals a number of attachable towing hitches or devices which attempt to solve the inherent problems. U.S. Pat. No. 3,627,352 issued to Canole on Dec. 14, 1971, discloses one variant in the class of folddown towing hitches. In Canole, a fold-down triangular-shaped towing bar is attached to the front bumper of the towed vehicle, allowing the bar to be moved to an upward storage position when not in use and unlatched and dropped down for attachment to a towing vehicle when being used as a tow bar. While Canole does provide a somewhat self-storing tow bar attached to the towed vehicle, it must remain attached to the front of the vehicle in plain view creating a rather unsightly appearance and further does not appear to be adaptable to modern vehicles having impact-absorbing bumpers.

Another example in the prior art is U.S. Pat. No. 3,105,706 issued to Adam on Oct. 1, 1963, for a collapsible tow hitch. The Adam tow hitch uses a single tow bar purportedly stabilized by a pair of diagonally-extending cables. While being collapsible, Adam nonetheless in its stored position provides an unsightly asymetric tow bar located across the front of the vehicle and further is not readily adaptable for use with current energy-absorbing bumpers.

Another attempt at solving the problems is disclosed in U.S. Pat. No. 3,774,949 issued to Eger on Nov. 27, 1973. Eger discloses a collapsible tow bar assembly storable within a specially designed bumper. It should be noted that Eger contemplates attachment of its device to the rear bumper of the towing vehicle and although not disclosed, apparently, requires a further assembly to be attached to the towed vehicle. The mechanism disclosed is unduly complex, having multiple parts, some of which are detached for storage and may be misplaced, lost, or otherwise unavailable when needed. Furthermore, Eger requires a specially built or adapted bumper for its use and thus incurs further cost to its user.

In order to provide a new and useful function of a foldable towing hitch, the device should be able to be collapsed into a minimal longitudinal space for storage on the vehicle and expandable to provide sufficient length and rigidity to allow the vehicle to be readily and safely towed when necessary.

Furthermore, with the advent of the more complex energy-absorbing bumpers required on current vehicles, the towing hitch must be able to be attached to the vehicle without interfering with the function of the bumper or other parts located on the front end of the vehicle.

SUMMARY OF THE INVENTION

The invention consists of an essentially triangular towing frame adapted for attachment to the front portion of the towed vehicle. The towing hitch includes a frame attached along a horizontal axis to the towed vehicle, having a pair of arms extendable therefrom. The arms are pivotally attached to the frame and extend convergently outward from the frame. The first arm is bifurcated along a central pivot allowing it to be folded inwardly upon itself while the attached second arm is pivoted inwardly thereover. In the folded position, the arms are located adjacent the frame and supported on a frame shelf attached to the frame. When extended, the first arm is pinned to rigidify the control pivot after extending both arms outwardly, forming a triangular hitch. The hitch bracket is pivotally attached at the juncture of the two arms and extends therefrom, terminating in a hitch suitable for attachment to a towing vehicle. When not in use, the hitch bracket is pivoted for storage along the second arm.

It is a principal object of the present invention to provide a foldable towing hitch readily attachable to an existing vehicle.

It is another object of the invention to provide a towing hitch which is both collapsible and rigid.

It is another object of the invention to provide a towing hitch which in its storage position does not protrude in front of or interfere with the operation of the vehicle bumper.

It is another object of the invention to provide a towing hitch that may be attached to either the bumper or the frame of the towed vehicle.

BRIEF DESCRIPTION OF THE DRAWINGS

The foregoing and other objects of the invention will become apparent upon a reading of the following specification, with reference to the appended claims and drawings, in which:

FIG. 1 shows an overhead plan view of the invention in a folded position;

FIG. 2 is an overhead view similar to FIG. 1 showing the invention in a partially-extended position;

FIG. 3 is an overhead view similar to FIG. 2 showing the invention in a fully-extended position;

DESCRIPTION OF THE PREFERRED EMBODIMENT

Figure 4:
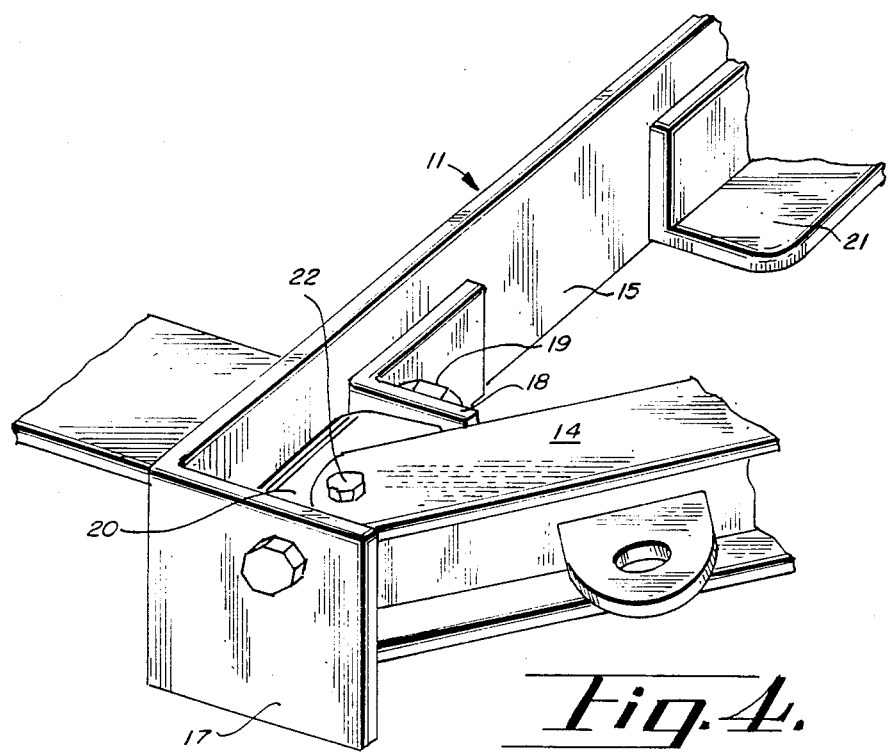
FIG. 4 is a partial perspective view of the invention showing the attachment of the arms to the frame.

Referring first to FIG. 3, showing the towing hitch 10 in an extended position. The hitch 10 consists generally of a frame 11, first converging arm 12 and a second converging arm 13 cooperating to form a rigid triangular structure. A hitch bracket 14 is attached at the juncture of the two arms 12, 13 and extends outwardly therefrom for attachment to the towing vehicle.

The frame 11 may be formed of any suitable rigid substance and is preferably formed from a ready work material such as iron or mild steel. The frame may have mounting brackets 16 attached at respective ends, formed of any suitable material and typically formed of the same material as the frame 11. The mounting brackets may be adapted to facilitate attachment to a particular vehicle, and as such the structure of the vehicle will dictate the exact spacing and shape of the mounting brackets.

In some instances, it is preferable to forgo the mounting brackets 16, as illustrated in FIG. 2, and attach the towing hitch 10 directly to the bumper, with this variation, the hitch frame is directly attached to the vehicle using bolts or other suitable fastening means.

Extending oppositely from the mounting brackets 16 and disposed at the ends of a frame crossbar 15 are the arm brackets. The arm brackets each consist of an outer bracket 17 and an inner bracket 18. The outer brackets 17 are located at the respective ends of the frame crossbar 15 and the inner brackets 18 are located a short distance inwardly therebetween. Passing between and connecting each set of arm brackets 17, 18 are the first arm pivots 19 which are located on a common center and essentially parallel to the frame crossbar 15. A pair of collars 20 are located between respective pairs of inner and outer arm brackets 17, 18 and have the arm pivots 19 passing therethrough. The collars 20 are fitted about the arm pivots 19 and may pivot thereabout.

A storage shelf 21 is attached to the frame crossbar 15 at its lower portion and centrally. The shelf 21 has suitable length along the length of the frame crossbar 15 to provide support for the towing hitch 11 when its in its collapsed position, as shown in FIG. 1. The shelf 21 extends outwardly from the frame crossbar 15 a distance slightly less than the width of the second arm 13.

The first arm 12 and the second arm 13 are attached through respective collars 20 with the respective second arm pivots 22. The second arm pivots 22 are essentially pins located perpendicular to the first arm pivots 19 allowing their respective arm 12, 13 to pivot when collapsing or extending the towing hitch 11. The first arm pivots thereby cooperating with the second arm pivot 22 allowing the arms 12, 13 to be moved in any direction with respect to the frame crossbar 15 effectively forming an articulated connection between the frame crossbar 15 and each respective arm 12, 13.

Figure 5:
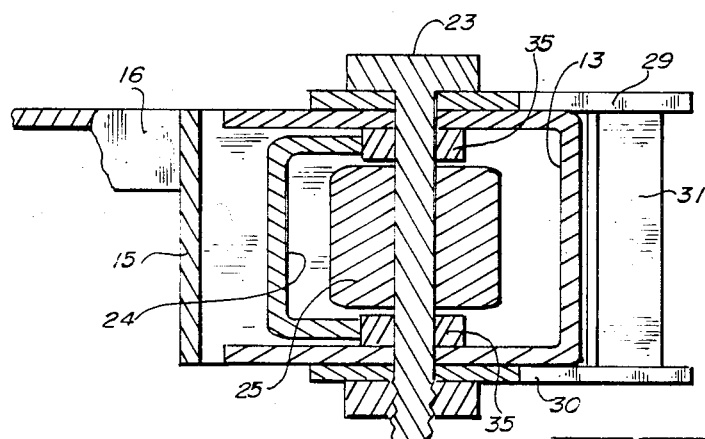
FIG. 5 is a cross-sectional view taken along line 5—5 of FIG. 1.

The first arm 12 extends from its respective second arm pivot 22 to the juncture with the second arm 13 and the hitch bracket 14 where it is retained using the junction pivot 23. The first arm 12, additionally, is a two-part structure having an inner arm 24 and an outer arm 25 pivotally joined at a folding pivot 26. Inner arm 24 is U-shaped in cross section and extends from the respective second arm pivot 22 past the folding pivot 26 and is sized to surround on three sides the outer arm 25 with the base of its U-shaped cross section abutting the outer arm 25, as shown in FIG. 5 while allowing the inner arm 24 to pivot with respect to the outer arm 25 upon the folding pivot 26 as more clearly shown in FIG. 2.

Thus the outer arm 25, while having a height less than the base of the U-shaped second arm 13, is located vertically along the junction pivot 23 between a pair of spacers 35. The arms 13, 24, and 25 are sized to nest when the towing hitch 10 is collapsed with outer arm 25 nesting within the inner arm 24, and the inner arm 24 nesting within the second arm 13. By nesting the arms as above described, the towing hitch 10 is collapsed for storage in a minimum amount of space allowing it to be stored within the space of the second arm 13 without extending unduly forward from the vehicle or above the frame cross bar 15.

The first arm 12 may be locked in the extended position as shown in FIG. 3 by inserting a lock pin 27 in the mating holes formed in the inner arm 24 and the outer arm 25 and the first arm may be collapsed as shown in FIG. 2 by removing the lock pin 27 and pivoting the inner arm 24 and the outer arm 25 about the folding pivot 26 as shown in FIG. 2.

The first arm 12 is illustrated as bifurcated and folding. It is understood that the first arm 12 may have more than two folding parts, or may be constructed from multiple concentrically overlying parts which may telescopically extend to a full length and telescopically retract to a length of one part. Other further variations will also become obvious to those skilled in the art.

The second arm 13 is attached to a respective second arm pivot 22 opposite the first arm 12 and extends outwardly therefrom to the junction pivot 23. The second arm 13 is U-shaped in cross section and dimensioned to fit about the inner arm 24 when the towing hitch 10 is in its collapsed position as shown in FIG. 5. Second arm 13 also has a handle 28 located upon its outer face and extending therealong.

The hitch bracket 14 consists of an upper plate 29 and a lower plate 30 connected with a connecting plate 31, shown in phantom in FIG. 3. The upper plate 29 and the lower plate 30 are connected to the first arm 13 and the second arm 12 through the junction pivot 23 which allows the hitch bracket 14 to pivot from its fully extended position as shown in FIG. 3 through an intermediate position, as shown in FIG. 2 to its fully stored position as shown in FIG. 1. When the hitch bracket 14 is fully extended, as shown in FIG. 3, it may be locked in that position using the bracket lock pin 32 which is passed through mating holes in the upper plate 29, the second arm 13 and the lower plate 30, respectively.

While the hitch bracket 14 is herein illustrated as an upper plate 29 parallel with the lower plate 30 having connector holes 33 passing therethrough suitable for attachment to a towed vehicle using a pin or clevis, it is understood that the hitch bracket 14 may be adapted for attachment to the towing vehicle using any number of methods well known in the art, such as a ring-and-pin hitch, a ball-and-socket hitch or other suitable methods.

In its use, the towing hitch 10 is first attached to the towed vehicle, not shown. The towing hitch 11 may be attached by attaching the mounting bracket 16 to either the bumper or the frame of the vehicle using bolts or other suitable fasteners. In other applications it will be necessary to attach the mounting brackets 16 directly to the frame of the vehicle owing to the unsuitability of the bumper of the vehicle for towing purposes. In some applications it would be preferable or necessary to use a towing hitch 10 without mounting bracket 16, as shown in FIG. 2 for attachment directly to the bumper of the vehicle through the frame crossbar 15 owing to the absence or unsuitability of the vehicle frame.

Once installed, the towing hitch may be extended for use by moving the bracket lock pin 32 from the connector holes 33 so that the hitch bracket 14 may be pivoted outward allowing the user access to the handle 28. The lock pin 27 is then removed from its storage position 34, as shown in FIG. 1 and the second arm 13 urged outwardly from its stored position as shown in FIG. 1 through an intermediate position as shown in FIG. 2 cooperatively extending the first arm 12 therewith. When the second arm 13 is fully extended, as shown in FIG. 3 the first arm 12 also becomes fully extended and may be locked in that position by placing the lock pin 27 in the mating holes in the first arm 13, thereby locking the inner arm 24 and the outer arm 25 of the first arm 12 in their fully-extended position. The hitch bracket 14 may be then fully pivoted to its extended position and the bracket lock pin 32 inserted therewith.

As fully extended, the towing hitch 11 is ready for attachment to a towing vehicle, not shown. For attachment to the towing vehicle, the hitch bracket 14 may be raised or lowered to a convenient height by pivoting the respective collars 20 on the first arm pivots 19. When the hitch bracket 14 is properly aligned with the towing vehicle a pin may be placed through the connector holes 33 thereby attaching the towing hitch 11 to the towing vehicle or otherwise attached when a different connecting method is utilized. The towing vehicle may then be operated and moved thereby towing the towed vehicle using the towing hitch 11.

After the towed vehicle has been removed to a desired location, it may be detached from the towing vehicle and the towing hitch 11 collapsed from its extended position as shown in FIG. 3 to its storage positions as shown in FIG. 1 by performing the same steps enumerated above in reverse order.

The towing hitch is thus stored on the vehicle allowing the use of the vehicle for other purposes without interference with the towing hitch.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A foldable towing hitch mountable upon a towed vehicle for towing by a second vehicle comprising:
   (a) a frame attachable to said towed vehicle;
   (b) a pair of nestable each having two ends arms pivotally attached at spaced-apart points to said frame and extending convergingly therefrom, the first of said arms formed into a bifurcated frame end piece and a hitch end piece, foldable to nest the hitch end piece within the frame end piece for changing the distance between the ends of said arm, said arms pivotally attached together at a hinge point distal from said frame attachment and the second of said arms formed into a second bifurcated frame piece foldable to nest the first arm within the second bifurcated frame piece;
   (c) a hitch bracket pivotally affixed to the pair of arms at said hinge point and retaining said arms in a converged relationship, the hitch bracket further having a means for attaching to the second vehicle.

2. The towing hitch of claim 1, wherein each of said arms is attached to said frame by a joint connection which is movable about two mutually perpendicular axes.

3. The towing hitch of claim 1, wherein the first arm further comprises a U-shaped frame end piece and a solid hitch end piece pivotally attached and foldable thereat for collapsing said first arm.

4. The towing hitch of claim 1, further comprising means for locking said frame end piece and said hitch end piece in an extended linear position with respect to each other.

5. The towing hitch of claim 4, wherein the means for locking the frame end piece and the hitch end piece in a linear position further comprises a set of mating holes in the respective end pieces and a pin insertable therein for locking said end pieces.

6. The towing hitch of claim 1, further comprising means for pivoting said hitch bracket about said hinge point.

7. The towing hitch of claim 6, wherein the hitch bracket further comprises means for retaining said hitch bracket to at least one of said arms in a fixed relationship thereto.

8. A retractable self-storing towing hitch mountable upon a towed vehicle and extendable for connection to a towing vehicle, comprising:
   (a) a frame mountable upon the towed vehicle and extending thereacross, the frame having a pair of first ears located at each end of said frame and extending outwardly therefrom, and further having a pair of rotatable collars each located between a first ear and a second ear of each pair, with a pivot pin extending parallel to the frame and between each respective first and second ears and through each respective collar; the frame further having a support shelf centrally located and extending outwardly therefrom;
   (b) a first and second arm, each pivotally attached to a respective collar, perpendicular to each respective said pivot pin, the arms further extending outwardly from said collars, the first arm having two pivotable sections;
      the first arm having a solid hitch end piece and a U-shaped frame end piece attached at a first end to one of said collars, the frame end piece sized to fit about said hitch end piece; said frame end piece having a second end pivotally attached to a first end of said hitch end piece; and
      the second arm being longer than the first arm and having a U-shaped cross section sized to nest about said frame end piece, and the second arm having a handle loop extending outwardly therefrom; and
   (c) a hitch bracket having upper and lower plates, and further having a pivot pin pivotally attaching the hitch bracket upper and lower plates proximate the distal end of the first arm and at the distal end of said second arm, the bracket further having a means for attachment to said towing vehicle.

* * * * *